US011898513B2

(12) United States Patent
Williams et al.

(10) Patent No.: US 11,898,513 B2

(45) Date of Patent: Feb. 13, 2024

(54) INTERNAL COMBUSTION ENGINE CONTROLLER

(71) Applicant: Perkins Engines Company Limited, Peterborough (GB)

(72) Inventors: Gavin Williams, Stamford (GB); Peter Ladlow, Bourne (GB); Ridwan Kureemun, Luton (GB); Baoyang Deng, Edwards, IL (US)

(73) Assignee: Perkins Engines Company Limited, Peterborough (GB)

( * ) Notice: Subject to any disclaimer, the term of this patent is extended or adjusted under 35 U.S.C. 154(b) by 37 days.

(21) Appl. No.: 17/606,670

(22) PCT Filed: Apr. 20, 2020

(86) PCT No.: PCT/EP2020/025181

§ 371 (c)(1),
(2) Date: Oct. 26, 2021

(87) PCT Pub. No.: WO2020/216471

PCT Pub. Date: Oct. 29, 2020

(65) Prior Publication Data

US 2022/0205405 A1 Jun. 30, 2022

(30) Foreign Application Priority Data

Apr. 26, 2019 (GB) ...................................... 1905882

(51) Int. Cl.

*F02D 41/14* (2006.01)
*F02D 41/24* (2006.01)
*F02D 41/02* (2006.01)

(52) U.S. Cl.

CPC ....... *F02D 41/1406* (2013.01); *F02D 41/248* (2013.01); *F02D 41/2441* (2013.01);
(Continued)

(58) Field of Classification Search

CPC ............... F02D 41/029; F02D 41/1405; F02D 41/1406; F02D 41/1438; F02D 41/2441;
(Continued)

(56) References Cited

U.S. PATENT DOCUMENTS 8,103,425 B2 1/2012 Choi et al.
8,893,546 B2 11/2014 Holberg et al.
(Continued)

FOREIGN PATENT DOCUMENTS

CN 101285427 10/2008
CN 107074245 8/2017
(Continued)

OTHER PUBLICATIONS

Rango, DE 102009021781, machine translation. (Year: 2009).*
(Continued)

*Primary Examiner* — Hung Q Nguyen
*Assistant Examiner* — Mark L. Greene

(57) ABSTRACT

An internal combustion engine controller for an internal combustion engine comprising a memory and a processor. The memory is configured to store a plurality of control maps, each control map defining a hypersurface of actuator setpoints for controlling an actuator of the internal combustion engine based on a plurality of input variables to the internal combustion engine controller. The processor comprises a map updating module, a parameter updating module and an engine setpoint module. The map updating module is configured to calculate an optimised hypersurface for at least one of the control maps based on a performance objective function of the internal combustion engine, sensor data from the internal combustion engine, and the plurality of input variables, wherein the performance objective function includes parameters. The parameter updating module is configured to update a parameter of the performance objec-
(Continued)

tive function upon determining a change in an operating condition of the internal combustion engine. The parameters comprise one or both of: engine parameters associated with an engine model; and cost parameters associated with a cost function. The map updating module is further configured to update the hypersurface of the control map based on the optimised hypersurface. The engine setpoint module is configured to output a control signal to each actuator based on a location on the hypersurface of the respective control map defined by the plurality of input variables.

18 Claims, 6 Drawing Sheets

(52) U.S. Cl.
CPC ........ *F02D 41/2477* (2013.01); *F02D 41/029* (2013.01); *F02D 41/1405* (2013.01); *F02D 41/1438* (2013.01); *F02D 2041/1412* (2013.01); *F02D 2041/1423* (2013.01); *F02D 2041/1433* (2013.01); *F02D 2250/36* (2013.01)

(58) Field of Classification Search
CPC ............... F02D 41/2477; F02D 41/248; F02D 2041/1412; F02D 2041/1423; F02D 2041/1433; F02D 2250/36
See application file for complete search history.

(56) References Cited

U.S. PATENT DOCUMENTS

| | | | | |
|---|---|---|---|---|
| 9,963,150 | B2 | 5/2018 | Livshiz et al. | |
| 10,626,817 | B1 * | 4/2020 | Piche | G05B 13/022 |
| 11,408,359 | B2 * | 8/2022 | Hriadel | F02M 35/1038 |
| 2007/0181096 | A1 | 8/2007 | Wagner et al. | |
| 2010/0168989 | A1 | 7/2010 | Gao et al. | |
| 2013/0111905 | A1 | 5/2013 | Pekar et al. | |
| 2014/0148928 | A1 | 5/2014 | Stewart | |
| 2015/0094939 | A1 | 4/2015 | D'Amato et al. | |
| 2016/0328500 | A1 | 11/2016 | Pachner | |
| 2018/0058350 | A1 | 3/2018 | Zhu et al. | |
| 2018/0113963 | A1 | 4/2018 | Kordon et al. | |
| 2018/0238257 | A1 | 8/2018 | Livshiz et al. | |
| 2018/0355812 | A1 | 12/2018 | Burgmair et al. | |
| 2022/0205404 | A1 * | 6/2022 | Williams | F02D 41/248 |

FOREIGN PATENT DOCUMENTS

| | | | |
|---|---|---|---|
| DE | 102009021781 | A1 | 11/2010 |
| EP | 1972767 | A1 | 9/2008 |
| WO | 2017075645 | A1 | 5/2017 |

OTHER PUBLICATIONS

International Search Report related to Application No. PCT/EP2020/025181; dated Jul. 23, 2020.

Great Britain Search Report related to Application No. 1905882.5; dated Oct. 18, 2019.

Urs Christen, et al., "Event-Based Mean-Value Modeling of DI Diesel Engines For Controller Design", SAE Technical Paper Series, Mar. 5-8, 2001, Detroit, Michigan.

Michele Steyskal, et al., "Development of PEMS Models for Predicting Nox Emissions from Large Bore Natural Gas Engines", SAE Technical Paper Series, Mar. 7-9, 2001, Orlando, Florida.

Chinese Office Action for Chinese Patent Appln. No.202080033619.6, dated Jun. 29, 2023 (3 pgs).

* cited by examiner

Input Variable 2

Input Variable 1

| | 500 | 1000 | 1500 | 2000 | 2500 | 3000 | 3500 | 4000 |
|---|---|---|---|---|---|---|---|---|
| 0.2 | 1 | 1 | 3 | 3 | 3 | 3 | 3 | 3 |
| 0.4 | 1 | 2 | 3 | 3 | 3 | 3 | 3 | 3 |
| 0.6 | 3 | 3 | 3 | 3 | 3 | 3 | 3 | 3 |
| 0.8 | 3 | 3 | 3 | 3 | 3 | 3 | 3 | 3 |
| 1 | 3 | 3 | 3 | 3 | 3 | 3 | 3 | 3 |
| 1.2 | 3 | 3 | 3 | 3 | 3 | 3 | 3 | 3 |
| 1.4 | 3 | 3 | 3 | 4 | 5 | 5 | 5 | 5 |
| 1.6 | 3 | 3 | 3 | 4 | 6 | 7 | 7 | 7 |
| 1.8 | 3 | 3 | 4 | 4 | 5 | 8 | 9 | 9 |
| 2 | 3 | 4 | 5 | 6 | 7 | 8 | 10 | 11 |

31

INTERNAL COMBUSTION ENGINE CONTROLLER

CROSS-REFERENCE TO RELATED APPLICATION

This Application is a 35 USC § 371 US National Stage filing of International Application No. PCMP20201025181 filed on Apr. 20, 2020 which claims priority under the Paris Convention to Great Britain Patent Application No. 1905882.5 filed on Apr. 26, 2019.

FIELD OF THE DISCLOSURE

The present disclosure relates to the control of an internal combustion engine. More specifically this disclosure relates to a system and method for controlling the actuators of an internal combustion engine.

BACKGROUND

Internal combustion engines often include one or more systems for managing the emissions output from the exhaust of the internal combustion engine. For example, internal combustion engines often include an after-treatment system for treating the exhaust gas produced by the internal combustion engine.

Typical after-treatment systems may include many sensors and (control) actuators. Further sensors and actuators may be provided in the internal combustion engine for monitoring exhaust gas, performance, and/or efficiency of the internal combustion engine. As such, internal combustion engines may include many independent controllable variables and calibration values. Thus, the design of an engine control system for an internal combustion engine is a multi-dimensional control problem.

Engine control systems need to provide setpoints to the actuators of the internal combustion engine in response to real time changes in the operating conditions of the internal combustion engine. The desire for high efficiency internal combustion engines which meet emissions regulations places a further restraint on the design of a control system. A further restraint on the design of the control system is that the amount of computing power available to the engine control system may be limited.

Conventionally, control of the internal combustion engine and after-treatment system is managed by an on-board processor (an engine control module). Due to the complexity of the internal combustion engine and after-treatment system, the engine control implemented typically utilises an open loop control system based on a series of "control maps" comprising pre-calibrated, time-invariant engine setpoints for the internal combustion engine and after-treatment system. Typically, the engine setpoints controlled include fuel mass, start of injection (SOI), exhaust gas recirculation (EGR) and inlet manifold absolute pressure (IMAP).

Some simple control maps comprise a plurality of look up tables, in which a number of time-invariant engine setpoints are stored associated with different engine operation conditions. An engine control module can simply read out engine setpoints from the control map associated with a desired engine operation. Some engine control maps can also provide estimates of one variable as a function of a limited number of other variables. Engine setpoint maps can only be based on a limited number of input variables due to the exponential increase in memory and map complexity as additional variables are included. In some cases, system memory can be compromised, but at the expense of interpolation error.

One method for reducing effects on performance of open-loop control scheme is to provide different control maps for different operating regimes. For example, different control maps may be provided for idle operation and full throttle operation, or start-up. Providing many different control maps per internal combustion engine makes calibration of each internal combustion engine expensive and time consuming. Furthermore, these pre-calibrated maps are each time-invariant lookup tables. Accordingly, these time-invariant control maps cannot take account of part-to-part variations in engine parts, or unmeasured influences like humidity for example. Time-invariant control maps also cannot accommodate variations in engine part performance over time.

An alternative approach is to implement real-time, on-board, model-based control of the engine to replace the pre-calibrated control maps. As such, an engine model directly controls one or more of the setpoints of the internal combustion engine. Model-based engine controls may include dynamic engine models to predict engine performance, emissions and operating states. Predicted engine performance can be fed back into the model to further optimise the engine setpoints. As such, model-based control methods effectively incorporate a form of negative feedback into the engine control system in order to improve performance and emissions.

Model-based control is difficult to implement as the engine setpoints must be calculated in real-time. Accordingly, model-based engine controllers including predictive elements ideally complete their predictions in real time as well. Thus, many model-based control schemes require significant computational resources to optimise model output within a suitable timescale for controlling an internal combustion engine.

SUMMARY OF THE DISCLOSURE

According to a first aspect of the disclosure, an internal combustion engine controller is provided. The internal combustion engine controller comprises a memory and a processor. The memory is configured to store a plurality of control maps, each control map defining a hypersurface of actuator setpoints for controlling an actuator of the internal combustion engine based on a plurality of input variables to the internal combustion engine controller. The processor comprises a map updating module, a parameter updating module and an engine setpoint module. The map updating module is configured to calculate an optimised hypersurface for at least one of the control maps based on a performance objective function of the internal combustion engine, sensor data from the internal combustion engine, and the plurality of input variables, wherein the performance objective function includes parameters. The parameters of the performance objective function comprise engine parameters associated with an engine model and/or cost parameters associated with a cost function. The parameter updating module is configured to update a parameter of the performance objective function upon determining a change in an operating condition of the internal combustion engine. For example, the parameter updating module may update an engine parameter and/or a cost parameter. Further, the map updating module is configured to update the hypersurface of the control map based on the optimised hypersurface. The engine setpoint module is configured to output a control signal to each actuator based on a location on the hypersurface of the respective control map defined by the plurality of input variables.

Accordingly, the internal combustion engine controller comprises three processing modules: an engine setpoint module, a map updating module and a parameter updating module. The engine setpoint module is configured to control a plurality of actuators of an internal combustion engine. For example, the engine setpoint module may control one or more of SOI, EGR, fuel mass, and inlet manifold absolute pressure requested (IMAPR) for an internal combustion engine. The engine setpoint module controls these actuators based on a performance input to the internal combustion engine, for example a user demand for torque, engine speed etc, or specified sensor data from the internal combustion engine (e.g. current inlet manifold absolute pressure). The control of each actuator is determined based on a control map for each actuator. Each control map defines a hypersurface for controlling an actuator of the internal combustion engine based on a plurality of input variables to internal combustion engine controller. As such, the engine setpoint module is effectively an open loop control module which utilises the actuator setpoints stored in the control maps to control the actuators.

The map updating module effectively operates independently from the open loop control of the engine setpoint module. The map updating module is configured to optimise the control of the internal combustion engine by updating the hypersurfaces of the control maps at a location defined by the input variables. As there are a plurality of actuators to be controlled, optimising the hypersurfaces is a multidimensional optimisation problem. The internal combustion engine controller according to the first aspect provides a map updating module which aims to solve the multidimensional optimisation problem in real time in computationaly efficient manner. As such, the map updating module is designed with the computational resources available to an on-board engine control module of an internal combustion engine in mind.

By providing a plurality of updatable control maps, a control map based controller may be provided which can be optimised to a range of different operating points using a limited number of control maps. Thus, the number of control maps that need to be calibrated for an internal combustion engine may be reduced, as the updatable maps of this disclosure may provide control covering a range of different operating points for which separate control maps may have been calibrated in the past. Accordingly, the complexity of initial calibration and set-up of an internal combustion engine may be reduced.

Furthermore, the ability of the plurality of control maps to cover a range of different operating points may be supplemented by the parameter updating module according to the first aspect of the disclosure. The parameter updating module may update the performance objective function of the map updating module in order to reflect a change in an operating condition of the internal combustion engine. Thus, the performance objective function of the map updating module may be applied to a wider range of operating points of the internal combustion engine, thereby reducing the need for additional control maps to be calibrated for the internal combustion engine.

The performance objective function includes engine parameters and cost parameters which may be updated by the parameter updating module. The engine parameters may be updated to compensate for uncertainty in engine performance in the performance objective function. For example, uncertainty in engine performance may arise from manufacturing variations between internal combustion engines, deterioration of the internal combustion engine and/or uncertainty in the operating environment (e.g. atmospheric conditions) of the internal combustion engine. As such, a time varying difference between an observed performance of the internal combustion engine and a modelled performance of the internal combustion engine may be determined by the parameter updating module as a change in the operating condition of the internal combustion engine. The parameter updating module may update engine parameters associated with the performance objective function to reduce uncertainty associated with the performance objective function.

In some embodiments, the internal combustion engine to be controlled may include an aftertreatment system. Accordingly, the sensor data provided to the internal combustion engine controller from the internal combustion engine may include sensor data from the aftertreatment system.

The cost parameters may be updated to reflect changes in performance targets for the performance objective function. For example, a performance target to enact a regeneration of the aftertreatment system may be implemented through a change in the cost parameters. Further, performance targets for the internal combustion engine controller may be updated to reflect changes in emissions requirements, and/or the operating environment of the internal combustion engine.

Accordingly, the parameter updating module may be configured to determine an operating condition of the internal combustion engine based on at least one of: the input variables to the internal combustion engine controller, sensor data from the internal combustion engine, sensor data from an aftertreatment system of the internal combustion engine, a performance target for the internal combustion engine, and the output of the real-time performance model.

The map updating module may comprise an optimiser module configured to search for an optimised hypersurface wherein the optimiser module selects a plurality of candidate groups of actuator setpoints to be evaluated by the performance objective function. The optimiser module may be configured to output an optimised hypersurface for the at least one control map based on the evaluations of the candidate groups of actuator setpoints by the performance objective function.

The performance objective function may comprise an engine modelling module and a cost module. The engine modelling module may be configured to calculate a plurality of engine performance variables associated with each candidate group of actuator setpoints based on the input variables, the sensor data from the internal combustion engine, the engine parameters, and the candidate group of actuator setpoints. The cost module may be configured to evaluate the engine performance variables and output a cost associated with each candidate group of actuator setpoints based on the cost parameters.

A change in the operating condition of the internal combustion engine may be based on an observed difference between the model and the internal combustion engine. The change in the operating condition may be determined based on a change in sensor data output from a sensor of the internal combustion engine relative to an engine performance variable representative of a predicted value of the sensor data. The parameter updating module may be configured to update the engine modelling module to reduce a difference between the sensor data and the engine performance variable representative of a predicted value of the sensor data below a predetermined threshold.

The engine parameters may comprise time varying engine parameters based on an input from an aftertreatment system connected to the internal combustion engine. For example, a time varying engine parameter may be updated to correct for uncertainty associated with a sensor providing the input from the aftertreatment system. By reducing uncertainty associated with the performance objective function, the map updating module may calculate optimised hypersurfaces which result in improved performance for the internal combustion engine.

The cost parameters may comprise a time varying cost parameter based on an input from an aftertreatment system connected to the internal combustion engine. For example a time-varying cost parameter may be updated to compensate for a time-varying change in the efficiency of the aftertreatment system. Generally, the conversion efficiency of a Selective Catalytic Reduction filter (SCR) of an after-treatment system can vary over time due to a number of factors. To maintain tail pipe NOx when SCR conversion efficiency is low, the engine out NOx constraint may be reduced through a change to an associated cost function parameter.

BRIEF DESCRIPTION OF THE FIGURES

The invention will now be described in relation to the following non-limiting figures. Further advantages of the disclosure are apparent by reference to the detailed description when considered in conjunction with the figures in which.

DETAILED DESCRIPTION

Figure 1:
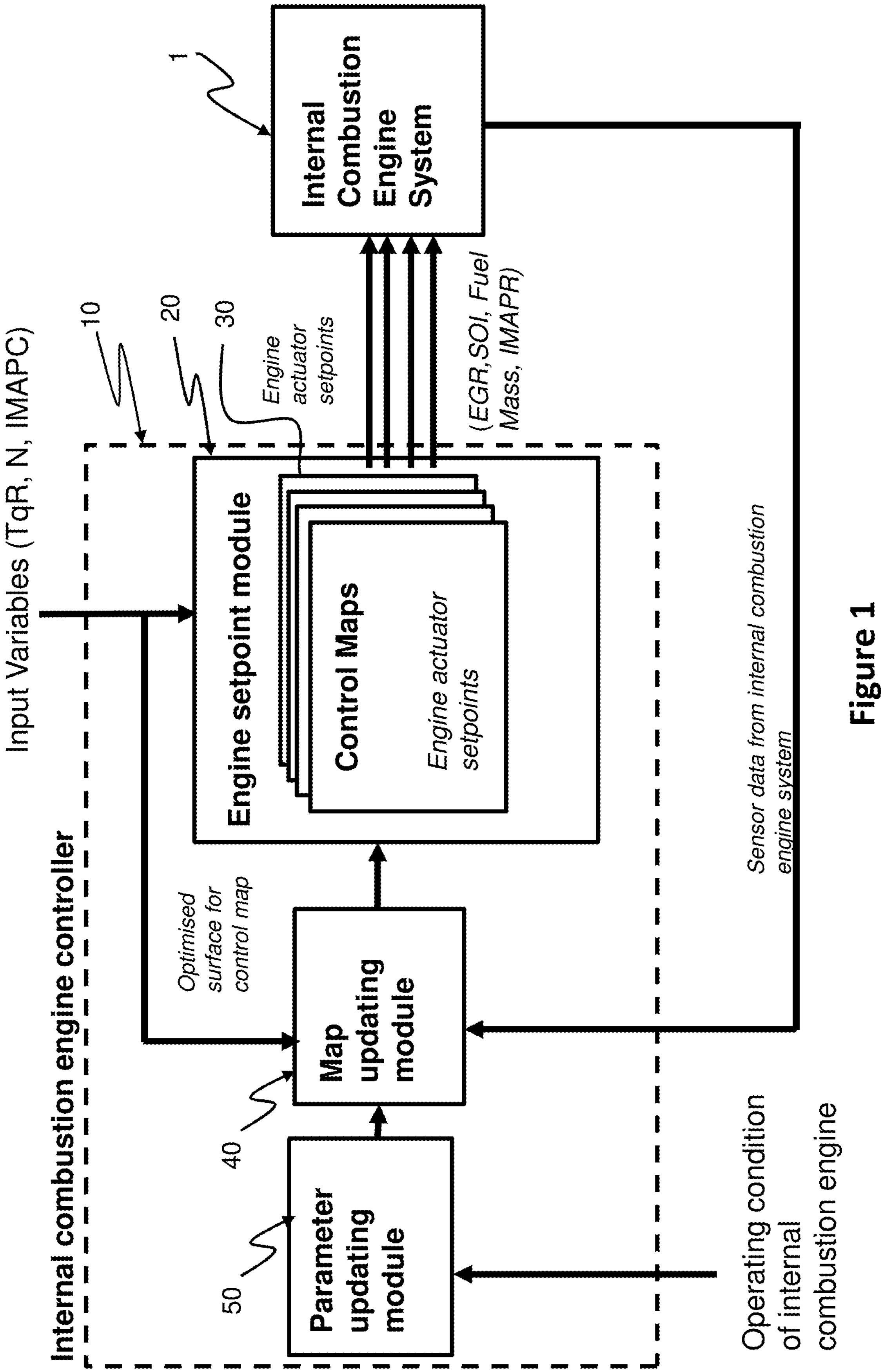
FIG. 1 shows a block diagram of a system comprising an internal combustion engine and an internal combustion engine controller according to an embodiment of this disclosure.

A general system diagram of an internal combustion engine 1 and an internal combustion engine controller 10 according to an embodiment of this disclosure is shown in FIG. 1.

The internal combustion engine controller 10 may comprise a processor and a memory (not shown). As such, the internal combustion engine controller 10 may be implemented on any suitable computing device known in the art. The internal combustion engine module may be provided on a dedicated engine control unit (e.g. an engine control module) comprising one or more processors and integrated memory. The internal combustion engine controller 10 may be connected to a variety of inputs and outputs in order implement the control scheme of this disclosure. As such, the internal combustion engine controller 10 may be configured to receive various input variables signals, sensor data and any other signals that may be used in the control scheme. For example, the internal combustion engine controller 10 may be configured to receive engine sensor data such as Engine Speed, Barometric pressure, Ambient temperature, IMAP, Inlet Manifold Air Temperature (IMAT), EGR mass rate (or sensors used to derive an EGR mass estimate), Fuel rail pressure, Air system valve positions, and/or Fuel mass estimate. The internal combustion engine controller may also be configured to receive aftertreatment sensor data such as Engine out NOx (e.g. Net Indicated Specific NOx), Tailpipe NOx, Diesel particulate filter soot sensor (RF soot sensor or differential pressure soot sensor), Diesel oxidation catalyst inlet temperature, and/or SCR inlet temperature.

As shown in FIG. 1, the actuators of the internal combustion engine are controlled by a plurality of engine actuator setpoints. The engine actuator setpoints are controlled by the internal combustion engine controller 10. In the embodiment of FIG. 1, the engine actuators to be controlled are EGR, SOI, Fuel Mass, and IMAP. Of course, in other embodiments, the engine actuators to be controlled may be varied.

As shown in FIG. 1, the internal combustion engine controller comprises an engine setpoint module 20. The engine setpoint module 20 is configured to output a control signal to each actuator based on the plurality of control maps 30 and the input variables to the engine setpoint module 20. As such, the operation of the engine setpoint module 20 is similar to the open loop, engine map based control schemes known in the prior art. Such open loop control schemes have relatively small computational requirements compared to more complex model-based control schemes.

The input variables to the engine setpoint module 20 may be a combination of different variables derived from the current operation of the internal combustion engine. Some of the input variables may be based on performance demands of the internal combustion engine. Some of the input variables may be based on the current operating state of the internal combustion engine, for example as measured by various sensors. As the input variables are used to determine an actuator setpoint based on a control map, it will be appreciated that the total number of input variables per control map may be restricted by the computational resources available to the internal combustion engine controller 10.

In the embodiment of FIG. 1, the input variables are requested torque (TqR), current engine speed (N), and current IMAP. In other embodiments, other input variables may be used such as current EGR (i.e. the current position of the EGR valve).

In general, it will be appreciated that some control actuators associated with the internal combustion engine may have some time lag associated with them. As such, there may be some time delay between a change in requested actuator setpoint (e.g. Requested IMAP) and the change being recorded by a sensor (i.e. a sensor reading of current IMAP).

Each of the plurality of control maps 30 defines a relationship between one or more of the input variables and an actuator setpoint. In the embodiment of FIG. 1, four control maps 30 are provided, one for controlling each of EGR, SOI, Fuel Mass, and IMAP Requested (IMAPR). Each of the control maps 30 may define an engine actuator setpoint based on one or more of the TqR, N and current IMAP (IMAPC). For example, the EGR control map may define a hypersurface of actuator setpoints based on the TqR, N, and IMAPC. As such, a combination of TqR, N and IMAPC defines a location of the hypersurface from which an actuator setpoint for EGR can be calculated. Similarly, the control maps 30 for SOI and Fuel mass may also be defined by a hypersurface which is a function of TqR, N, and IMAPC. The control map for IMAPR in the embodiment of FIG. 1 may be defined by a hypersurface which is a function of TqR and N. As such, different control maps may have a different number of dimensions.

Figures 2A, 2B:
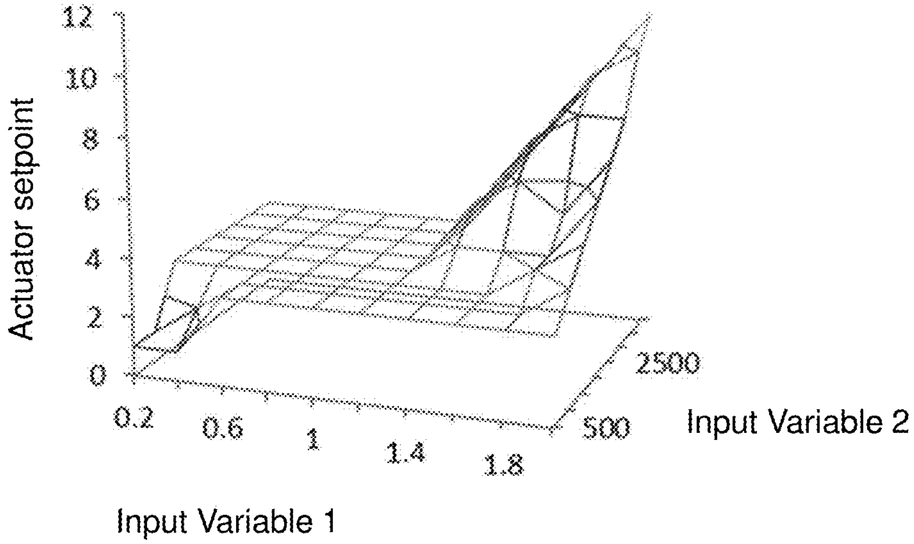
FIG. 2*a* is an example of look-up table control map and FIG. 2*b* is a graphical representation of the hypersurface defined by the values in the look-up table control map of FIG. 2*a;*

Each of the control maps 30 of FIG. 1 may be implemented as a look-up table. Look-up table control maps 30 for engine controllers are well known in the art. An exemplary look-up table control map 31 is shown in FIG. 2*a*. The look-up table control map 31 shown in FIG. 2*a* has two input dimensions and a single output dimension. Accordingly, in the embodiment of FIG. 2*a*, the control map 31 is a two-dimensional control map, wherein the number of dimensions recited is determined by the number of input dimensions. The control map 31 of FIG. 2*a* comprises input variable 1 (i.e. a first input variable) and input variable 2 (a second input variable). The look-up table defines a plurality of values (actuator setpoints) for different combinations of input variable 1 and input variable 2. As such, the lookup table control map 31 may be used to select an actuator setpoint based on the values of input variables 1 and 2. FIG. 2*b* is a graphical representation of the hypersurface defined by the values in the look-up table control map 31. As is known in the art, interpolation of the setpoints defined in the look-up table may be used to find a location on the hypersurface where one or more of the input variables do not exactly match the values stored in the look-up table.

In other embodiments, alternative means may be used to describe the hypersurface for each control map 30. For example, the hypersurface may be defined as a function of the input variables. Suitable multidimensional functions for defining a hypersurface may be a universal approximator function. Suitable universal approximator functions may include: artificial neural networks (e.g. radial basis functions, multilayer perceptrons), multivariate polynomials, fuzzy logic, irregular interpolation, kringing.

The plurality of control maps 30 may be stored in the memory of the internal combustion engine controller 10 such that the various processing modules of the internal combustion engine controller 10 can access the control maps 30.

As shown in FIG. 1, the internal combustion engine controller 10 also includes a map updating module 40. The map updating module 40 is configured to calculate an optimised hypersurface for at least one of the control maps 30. In the embodiment of FIG. 1, the map updating module 40 may calculate an optimised hypersurface for each of the control maps 30 concurrently. The map updating module 40 is configured to update the hypersurface of a control map 30 based on the optimised hypersurface calculated. Accordingly, the hypersurface for one or more control maps 30 may be updated during operation of the internal combustion engine 1. By providing a set of updatable control maps 30, a set of control maps 30 may be provided which can be optimised to a range of different operating points. Thus, the number of control maps that need to be calibrated for an internal combustion engine 1 may be reduced, as the set of updatable control maps 30 of this disclosure may control the internal combustion engine 1 over a range of different operating points for which separate sets of control maps (i.e. multiple sets of control maps) may have been calibrated in the past.

The map updating module 40 is configured to calculate the optimised hypersurface based on a performance objective function. The performance objective function may be evaluated in real time, rather than, for example, an off-line calculation of historic engine data. The performance objective function uses sensor data from the internal combustion engine 1 and the plurality of input variables (i.e. real-time input variables to the internal combustion engine 1) to calculate the optimised hypersurface. The performance objective function includes engine parameters associated with an engine model and/or cost parameters associated with a cost function which are used to calculate the optimised hypersurface. As such, the performance objective function may be a multidimensional function. Effectively, the internal combustion engine controller 10 of this disclosure incorporates additional variables (direct and/or indirect sensor data variables) into the control of the internal combustion engine 1 in manner which does not significantly increase the computational complexity of the map based control.

The map updating module 40 may use the performance objective function to search for an optimised hypersurface. For example, the map updating module 40 may search for an optimised hypersurface by modelling a real-time performance of the internal combustion engine 1 based on the engine parameters associated with the engine model and calculate a cost associated with the modelled real-time performance. The map updating module 40 may repeat this process for a plurality of candidate groups of actuator setpoints and subsequently determine the optimised hypersurface based on the lowest cost candidate group of actuator setpoints.

For example, the map updating module 40 may be configured to calculate an optimised hypersurface for the IMAPR control map. The IMAPR control map 30 may be based on the input variables: engine speed (N) and Torque Requested (TqR). The map updating module 40 may model the real-time performance of the internal combustion engine 1 for a plurality of candidate groups of engine actuator setpoints. For example a candidate group of engine actuator setpoints may include: SOI, Fuel mass, EGR Requested, and IMAPR. The map updating module 40 may vary one or more of the engine actuator setpoints between each candidate group of engine actuator setpoints in order to search for an optimised hypersurface for the IMAPR control map 30. In one embodiment in which only the IMAPR control map 30 is updated, the engine actuator setpoint for IMAPR may be varied between each of the candidate groups of engine actuator setpoints. Based on the output of the performance objective function for each candidate group, the map updating module 40 may determine an optimised hypersurface for the IMAPR control map. As discussed above, the optimised hypersurface may be a portion of the total hypersurface defined by the control map 30 (i.e. only a portion of the total hypersurface defined by the control map may be updated).

As shown in FIG. 1, the internal combustion engine controller 10 also includes a parameter updating module 50. The parameter updating module 50 is configured to update one or more parameters of the performance objective function. In particular, the parameter updating module 50 is configured to update an engine parameter and/or a cost parameter of the performance objective function.

The parameter updating module 50 is configured to update a parameter of the performance objective function upon determining a change in an operating condition of the internal combustion engine. An operating condition of the internal combustion engine may be based on at least one of: the input variables to the internal combustion engine controller, sensor data from the internal combustion engine, and sensor data from an aftertreatment system of the internal combustion engine. By monitoring one or more of these variables, the parameter updating module may determine that a change in the operating condition has occurred and elect to update one or more parameters (cost parameters and/or engine parameters) of the performance objective function in response to the change. The determination of a change in an operating condition of the internal combustion engine by the parameter updating module 50 is discussed in more detail below in relation to FIG. 5.

By updating the parameters of the performance objective function, the optimised hypersurface calculated by the map updating module 40 may take into account a change in the operating condition of the internal combustion engine. Accordingly the map updating module may be more responsive to time varying changes in the performance of the internal combustion engine. For example, the parameter updating module may detect a change in the operating condition of the internal combustion engine associated with a change in the calibration of one or more sensors of the internal combustion engine and/or aftertreatment system and proceed to update associated performance parameters to account for the sensor calibration over time. Alternatively, variation over time and/or uncertainty between modelled performance of the internal combustion engine and the actual real-time performance of the internal combustion engine may be detected as a change in the operating condition of the internal combustion engine by the parameter updating module.

Figure 3:
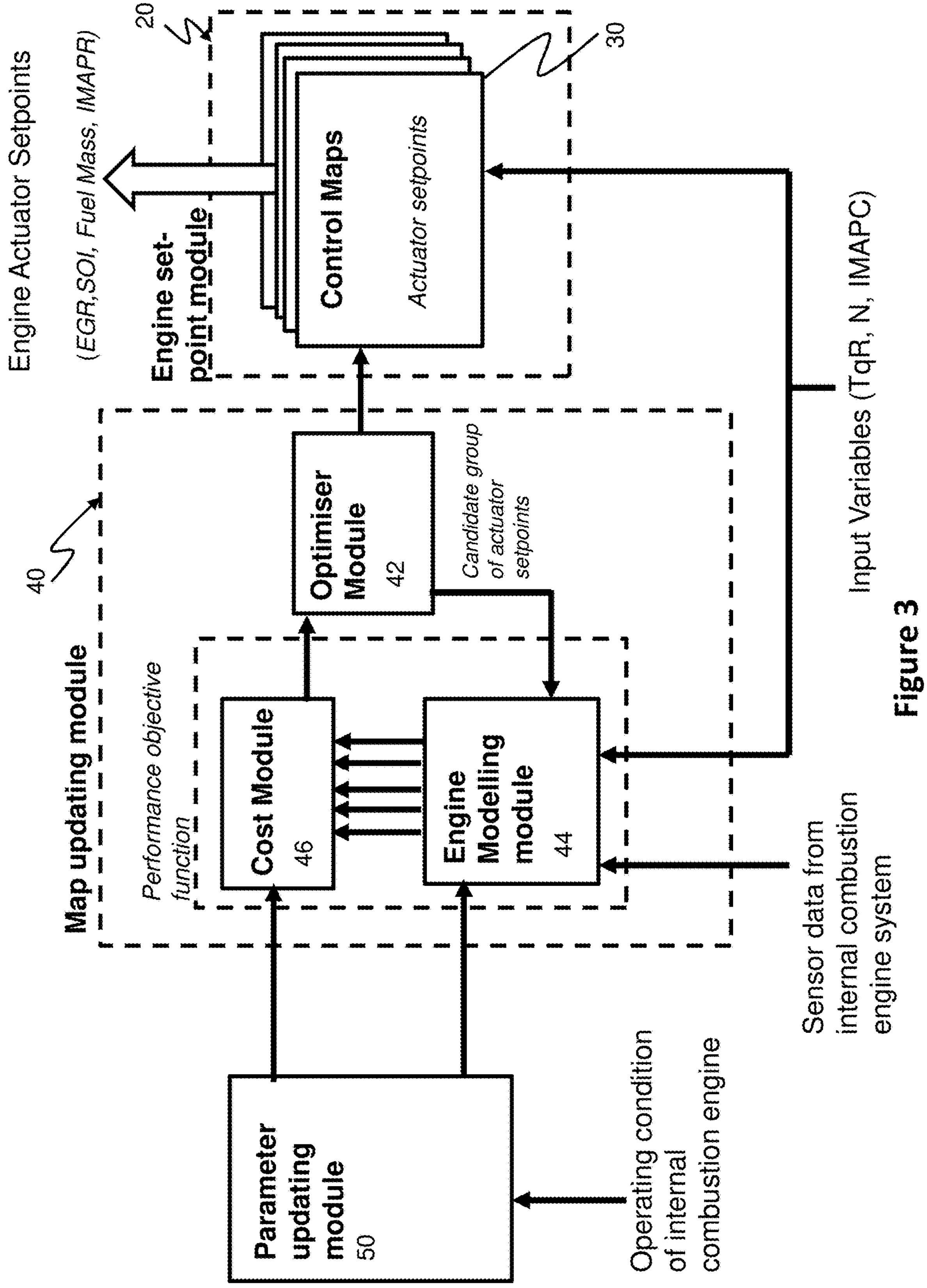
FIG. 3 shows a block diagram of an internal combustion engine controller according to an embodiment of this disclosure.

FIG. 3 shows a more detailed block diagram of an internal combustion engine controller 10 according to an embodiment of the disclosure. The block diagram indicates in dashed lines that the map updating module 40 includes the performance objective function and an optimiser module 42. For the purposes of further explaining the performance objective function, the performance objective function is represented in FIG. 3 as comprising an engine modelling module 44 and a cost module 46. Of course it will be appreciated that the engine modelling module 44 and cost module 46 may also be provided as one combined "black box" function (i.e. as the performance objective function of FIG. 1). As such, the internal combustion engine controller 10 has a similar general structure to the structure shown in FIG. 1.

The internal combustion engine controller 10 of FIG. 3 also comprises an engine setpoint module 20. With reference to FIG. 1 and the corresponding description, it will be understood that the engine setpoint module 20 of FIG. 3 is configured to output a plurality of actuator setpoints based on locations on hypersurfaces of respective control maps 30 defined by the plurality of input variables.

The map updating module 40 comprises an optimiser module 42, and engine modelling module 44 and a cost module 46. As discussed above, the map updating module 40 is configured to calculate an optimised hypersurface for one or more of the control maps 30. In this embodiment, the map updating module 40 is configured to calculate an optimised hypersurface for a plurality of the control maps 30. For example, in the embodiment of FIG. 3, control maps for each of SOI, Fuel mass, EGR Requested, and IMAPR are provided. The control maps 30 for SOI, Fuel mass, and EGR Requested are each a function of input variables engine speed (N), Torque Requested (TqR) and IMAPC. The control map for IMAPR is a function of engine speed (N) and Torque Requested (TqR).

The optimiser module 42 is configured to search for an optimised hypersurface for at least one of the control maps 30. In this embodiment, the optimiser module 42 is configured to search for an optimised hypersurface for each of the control maps 30 for SOI, Fuel mass, and EGR Requested concurrently. The optimiser module 42 may be configured to search for an optimised hypersurface for IMAPR at a different time. As such, it will be appreciated that the map updating module 40 does not need to update all of the control maps at the same time. In other embodiments, it will be appreciated that the map updating module 40 may update all of the control maps at the same time.

The optimiser module 42 is configured to search for an optimised hypersurface wherein the optimiser module 42 provides a plurality of candidate groups of actuator setpoints to an engine modelling module 44. Each candidate group of actuator setpoints is effectively a vector of actuator setpoints. The candidate group of actuator setpoints may include an actuator setpoint for each control map 30 to be updated. The candidate group of actuator setpoints may also include actuator setpoints for control maps 30 which are not presently being updated by map updating module 40. For example, in the embodiment of FIG. 3 a candidate group of actuator setpoints comprises a setpoint for each of SOI, Fuel mass, EGR Requested and IMAPR. By including the IMAPR actuator setpoint in the candidate group, even though this control map 30 is not being updated, the real-time performance model accuracy may be improved. Essentially, in the embodiment of FIG. 3, the IMAPR setpoint is treated as a time-invariant setpoint. Control maps (e.g. the control map for IMAPR) not updated by the optimiser module 42 may be updated by other means. As discussed further below, a plurality of different optimiser functions may be provided to update different control maps.

The optimiser module 42 outputs each candidate group of actuator setpoints to the engine modelling module 44 which forms part of the performance objective function. The optimiser module 42 may select the candidate groups of actuator setpoints to be evaluated by the performance objective function in a variety of ways. For example, the optimiser module 42 may select each actuator setpoint within a candidate group of actuator setpoints randomly from a predefined range of allowable actuator setpoints. Thus, a candidate group of actuator setpoints may be a group of essentially randomised actuator setpoints. As such, the optimiser module 42 may select candidate groups of actuator setpoints at random (a randomised search strategy). Alternative searching strategies may also be utilised, as discussed in more detail below.

The number of candidate groups of actuator setpoints selected by the optimiser module 42 may be predetermined according to the computational resources available for calculating the optimised hypersurface. The map updating module 40 is configured to output an optimised hypersurface to optimise a location on the control maps corresponding to the current operating point of the internal combustion engine. Accordingly, the map updating module 40 may update the control maps in real-time, thereby placing a limit on the amount of processing time available for calculating the optimised hypersurface. For example, in the embodiment of FIG. 3, the map updating module is configured to output an optimised hypersurface within 60 ms. The processing time taken to evaluate a single candidate group of engine actuator setpoints using the performance objective function will place an upper limit on the number of possible candidate groups that may be evaluated within a single 60 ms period. The processing time taken to evaluate a single candidate group of engine actuator setpoints will depend on the computational complexity of the performance objective function.

In the embodiment of FIG. 3, the processing time may depend on the computational complexity of the engine modelling module 44 and the cost module 46 which are explained in more detail below. Typically, evaluating a single candidate group of engine actuator setpoints using the performance objective function may take around 0.1 ms. So, in the embodiment of FIG. 3, about 200 candidate groups of engine actuator setpoints may be evaluated by the map updating module 40, taking around 20 ms. Accordingly, for a map updating module 40 configured to output an optimised hypersurface within 60 ms, a processing time budget of around 30 ms may be allocated for residual processing and around 10 ms of slack time.

As an alternative to a randomised searching strategy, other searching strategies may be employed by the optimiser module 42. For example, the candidate groups of actuator setpoints may be selected according to an iterative searching strategy. As part of an iterative searching strategy a first set of candidate groups of actuator setpoints may be identified and analysed as described above to determine associated costs. The optimiser module 42 may then select a second set of candidate groups of actuator setpoints based on the first set of actuator setpoints and the associated costs (i.e. based on the lowest cost candidate groups of the first set of candidate groups). Examples of suitable searching iterative searching strategies include Genetic algorithms, Simplex, Stochastic optimisation and/or swarm algorithms.

The engine modelling module 44 is configured to calculate a plurality of engine performance variables associated with each candidate group of actuator setpoints. The inputs to the engine modelling module 44 are the plurality of input variables of the control maps, as well as sensor inputs from the internal combustion engine, and the candidate group of actuator setpoints. As such, the engine modelling module 44 is provided with a plurality of input variables associated with the real-time operating point of the internal combustion engine. Accordingly, the plurality of engine performance variables calculated by the engine modelling module 44 may be representative of the real-time performance of the internal combustion engine.

In the embodiment of FIG. 3, the engine modelling module 44 is provided with a candidate group of actuator setpoints for SOI, Fuel mass, EGR Requested, and IMAPR. The engine modelling module is also provided with real-time data from a plurality of sensors of the internal combustion engine. Sensor data from the internal combustion engine 1 may include information from various sensors associated with the internal combustion engine 1. Sensor data may also include variables derived from data from one or more sensors of the internal combustion engine. For example the sensor data may include inlet manifold absolute pressure, inlet manifold temperature, fuel rail pressure, back pressure valve position, mass EGR flow, mass total air flow, fuel mass flow, fuel rail pressure (FRP).

The engine modelling module 44 may include one or more engine models configured to calculate a plurality of engine performance variables associated with each candidate group of actuator setpoints. It will be appreciated that as the inputs to the engine modelling module 44 include the input variables to the internal combustion engine and the sensor data, the engine performance variables will be representative of a real-time performance of the internal combustion engine under those actuator setpoints. The engine performance variables calculated may include: engine torque, mass airflow, brake mean effective pressure (BMEP), net indicated mean effective pressure (IMEP), pumping mean effective pressure (PMEP), friction mean effective pressure (FMEP), exhaust manifold temperature, peak cylinder pressure, a NOx quantity (e.g. Net Indicated Specific NOx (NISNOx), Brake Indicated Specific NOx) Soot quantity (e.g. Net Indicated Specific Soot, Brake Indicated Specific Soot), NOx/Soot ratio, minimum fresh charge, and EGR potential.

Where applicable, the internal combustion engine controller calculates Net Indicated Specific engine performance variables (e.g. IMEP, NISNOx) rather than Brake Indicated Specific performance variables. IMEP reflects the mean effective pressure of the internal combustion engine across the whole engine cycle. By contrast, BMEP is the mean effective pressure calculated from the brake torque. Net Indicated Specific values (e.g. IMEP, NISNOX) may be used in some embodiments as these values are non-zero even when the engine is idling.

In this disclosure, Net indicated specific NOx (NISNOx) and Brake Indicated Specific NOx are further intended to refer to the NOx quantity output by the internal combustion engine, prior to any treatment in an aftertreatment system. Of course, the skilled person will appreciate that the NOx quantity may also be estimated downstream of the aftertreatment system (e.g. tailpipe NOx).

In order to calculate one or more of the above engine performance variables from the inputs to the engine modelling module 44, one or more engine parameters may be used. The engine parameters may be used to define a relationship between one or more of the above performance variables and the inputs to the engine modelling module. For example, various physical relationships between the above performance variables and the inputs provided to the engine modelling module are well known to the skilled person. As such, the engine modelling module may provide one or more physics based models to calculate one or more of the above performance variables. As an alternative to physics based models, the engine modelling module 44 may also calculate one or more of the above performance variables using empirical/black box models, or a combination of empirical and physics based models (i.e. semi physical/grey box models).

For example, the engine modelling module 44 may include a mean value engine model. Mean value engine models are well known to the skilled person for modelling engine performance parameters such as BMEP, engine torque, mass airflow etc. Further explanation of a mean value engine model suitable for use in the present disclosure may be found "Event-Based Mean-Value Modeling of DI Diesel Engines for Controller Design" by Urs Christen et al, SAE Technical Paper Series. Thus, a mean value engine model may be used to calculate engine performance variables based on the inputs to the engine modelling module 44.

In addition to, or as an alternative to, the use of a mean value model, the engine modelling module 44 may include one or more neural network based models for calculating one or more engine performance variables. For example, a Net Indicated Specific NOx (NISNOx) engine performance variable may be calculated from the sensor data using a suitably trained neural network. Further explanation of suitable techniques for calculating engine performance variable such as NOx quantity (e.g. NISNOx) using a neural network may be found in "Development of PEMS Models for Predicting NOx Emissions from Large Bore Natural Gas Engines" by Michele Steyskal et al, SAE Technical paper series.

Physics based models of one or more internal combustion engine components may be provided. For example, a compressor model, a turbine model, or an exhaust gas recirculation cooler model may be provided in order to help calculate suitable engine performance variables.

The engine modelling module 44 outputs the engine performance variables to the cost module 46. The cost module 46 is configured to evaluate the engine performance variables and output a cost associated with each candidate group of actuator setpoints based on the performance variables. In the embodiment of FIG. 3 the cost module 46 is configured to output the cost associated with each candidate group of actuator setpoints to the optimiser module 42. In other embodiments, the evaluation of the costs associated with each candidate group of actuator setpoints may be performed by a further module separate to optimiser module 42.

The cost module 46 may comprise a plurality of cost functions configured to assign a cost to various performance targets in order to evaluate the modelled performance of the internal combustion engine under the candidate group of actuator setpoints. Each cost function may determine a cost based on or more engine performance variables and one or more cost parameters. For example, the plurality of cost functions may comprise one or more operating target functions, one or more emissions functions, and one or more engine constraint functions. Each of the plurality of cost functions may be configured to output a cost based on a function of one or more of the engine performance variables and one or more cost parameters. The cost parameters may determine the magnitude of the cost associated with each engine performance variable. The cost parameters may also determine the relative cost of each cost function relative to the other cost functions. In the embodiment of FIG. 3, the cost functions are configured such that a lower cost is associated with a more optimal performance.

Figure 4A:
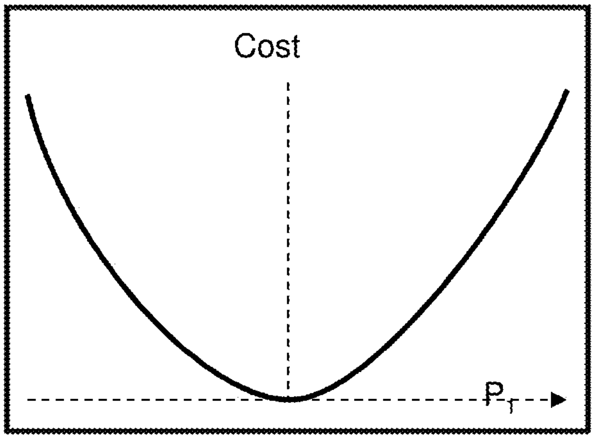
FIGS. 4*a*, 4*b* and 4*c* show graphical representations of suitable functions for an operating target function, an emissions function, and an engine constraint function respectively.

An operating target function may be a cost function configured to optimise the internal combustion engine to meet certain targets for operating the internal combustion engine. For example, one target may be to operate the internal combustion engine while minimising Brake Specific Fuel Consumption (BSFC) or Net Indicate Specific Fuel Consumption (NISFC). Another operating target may be to minimise torque error (i.e. the difference between the actual output torque and the torque requested). Such forms of operating target function may be represented by a function having a weighted square law relationship (i.e. of the form: Cost=Weight*(performance variable)^2). As such, for an operating target function, the weight of the operating target function is a cost parameter. A graphical representation of a suitable operating target function is shown in FIG. 4*a*. For example, a cost associated with the operating target for NISFC ($Cost_{NISFC}$) may be:

$$Cost_{NISFC}=Weight_{NISFC}*NISFC\hat{}2$$

Figure 4B:
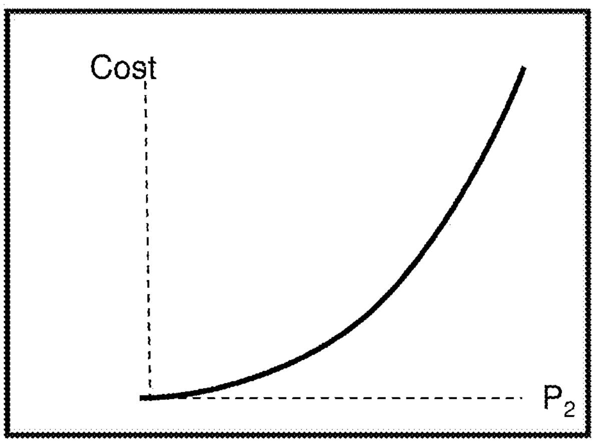

An emission function may be a function configured to optimise the internal combustion engine in order to meet certain objectives in relation to the emissions produced by the internal combustion engine. For example one or more emissions function may be provided based on engine performance variables relating to emissions produced by the internal combustion engine. As such, one or more emissions functions may be based on NOx quantity (NISNOx, Soot (NISCF), NOx Soot ratio, minimum fresh charge, and/or EGR potential. The emissions functions may define a relationship between a cost and the engine performance variables using any suitable function. For example, in the embodiment of FIG. 3, the emissions functions may be provided as one sided square law functions. A graphical representation of a suitable emissions function is shown in FIG. 4*b*.

For example, an emissions function may include a target upper limit ($T_U$). The target upper limit may define a value for an engine performance variable above which the cost incurred becomes significant, whereas for values below the target upper limit, no cost, or minimal cost is incurred. For example, for some internal combustion engines, a target upper limit for NISNOx may be 4 g/kWh. Thus, for an emissions function a target upper limit, and/or a weight may be a cost parameter. In other embodiments, a target limit may be provided as a target lower limit.

Figure 4C:
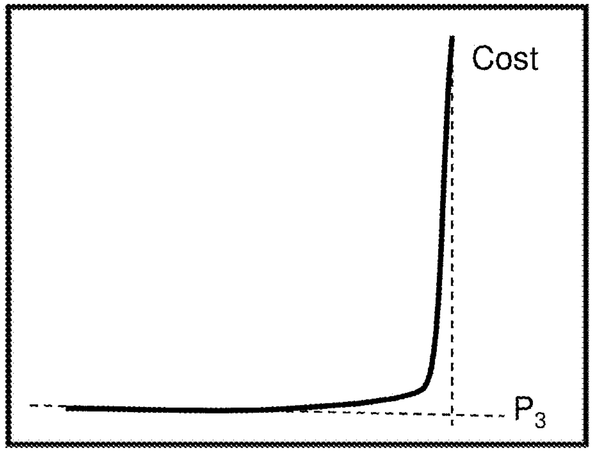

Accordingly, an emissions function ($Cost_{NOx}$) based on the engine performance variable NISNOx may be:

When: $NISNOx<T_U$, $Cost_{NOx}=0$ $NISNOx\geq T_U$, $Cost_{NOx}=Weight_{NOx}*(NISNOx-T_U)\hat{}2$ Some emissions functions may also be defined by a minimum, or target lower limit ($T_L$). For example, an emissions function ($Cost_{EMT}$) based on the engine performance variable Exhaust minimum temperature (EMT) may be defined as:

When: $EMT>T_L$, $Cost_{EMT}=0$ $EMT\leq T_L$, $Cost_{EMT}=Weight_{EMT}*(EMT-T_L)\hat{}2$ An engine constraint function may be a function configured to reflect constraints associated with the operation the internal combustion engine. As such, the one or more engine constraint functions may be provided to discourage or prevent the controller from operating the internal combustion engine at certain engine actuator setpoints. For example, one or more engine constraint functions may be based on engine performance variables which have fixed limits which cannot be exceeded due to physical requirements of the internal combustion engine. As such, one or more engine constraint functions may be based on peak cylinder pressure (PCP), exhaust manifold temperature, compressor outlet temperature. Further engine performance variables which may have desirable fixed limits such as maximum allowable torque error may also have a corresponding engine constraint function. Each engine constraint function may define a relationship between a cost and one or more of the engine performance variables using any suitable function. The engine constraint function may also include a cost parameter. For example, in the embodiment of FIG. 3, the engine constraint functions may be provided in the form Cost=1/engine performance variable(s). A graphical representation of a suitable engine constraint function is shown in FIG. 4*c*.

For example, an engine constraint function for the engine performance variable PCP may be provided based on a PCP upper limit L. The cost calculated by the engine constraint function may rise asymptotically as the PCP upper limit L is approached. Thus, a limit L may also be a cost parameter. Accordingly, an engine constraint function ($Cost_{PCP}$) based on the engine performance variable PCP may be:

$$Cost_{PCP}=1/(L-PCP)$$

As the engine constraint functions typically relate to engine performance variables which have fixed limits based on physical requirements of the internal combustion engine, in some embodiments, the parameter updating module may not update cost parameters associated with the engine constraint functions. For example, the PCP upper limit L may be a time invariant cost parameter.

As described above, various cost parameters have been described with respect to operating target functions, emissions functions, and engine constraint functions. The cost parameters may be stored by the cost module 46, for example as a cost parameter vector.

Accordingly, the cost module 46 may calculate a total cost associated with each candidate group of actuator setpoints based on the costs calculated by each of the cost functions calculated above. The total cost associated with each candidate group of actuator setpoints may be provided to the optimiser module 42 for further processing.

As shown in FIG. 3, one or more of the cost parameters may be updated by the parameter updating module 50. The updating of the cost parameters is discussed in more detail below.

The optimiser module 42 is configured to output an optimised hypersurface for the at least one control map 30 based on the candidate groups of actuator setpoints and the associated costs. As such, based on the total cost for each candidate group of actuator setpoints, the optimiser module 42 may identify a group of actuator setpoints which has an optimal performance. For example, the candidate group of actuator setpoints with the lowest total cost may provide optimal performance. Accordingly, the optimiser module 42 may determine that the candidate group of actuator setpoints with the lowest total cost is an optimised group of actuator setpoints. The map updating module may update one or more of the hypersurfaces of the control maps at the location defined by the input variables based on the optimised group of actuator setpoints.

Accordingly, an internal combustion engine controller 10 in accordance with the diagram shown in FIG. 3 may be provided.

Figure 5:
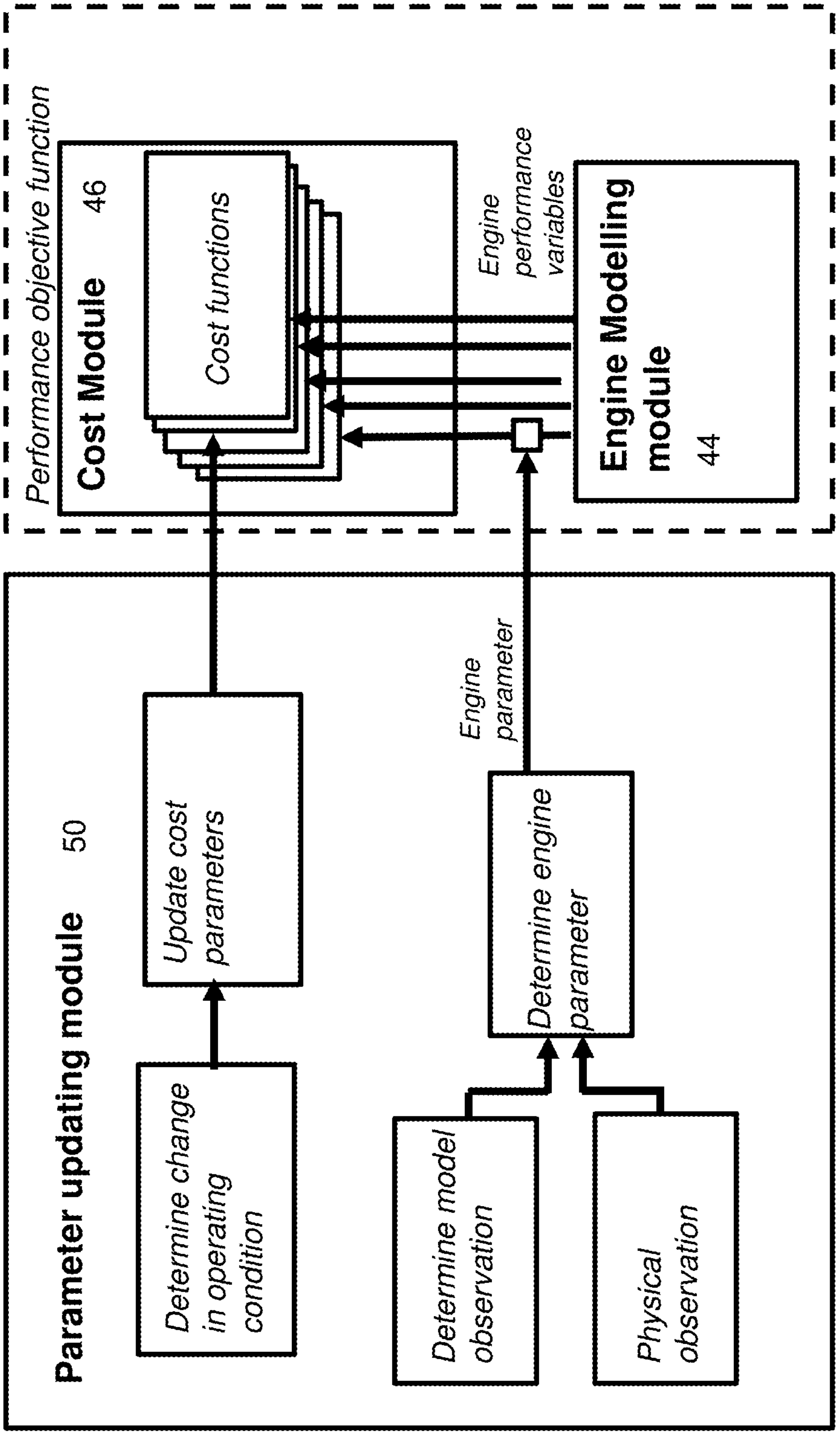
FIG. 5 shows a detailed block diagram of a parameter updating module and part of a map updating module according to an embodiment of this disclosure.

FIG. 5 shows a more detailed block diagram of the parameter updating module 50 and part of the map updating module 40. The parameter updating module 50 aims to update one or more engine parameters and/or cost parameters of the performance objective function. The parameters to be updated generally serve one of two purposes. Engine parameters associated with the engine model (i.e. forming part of the engine modelling module 44) may be updated in order to reduce uncertainty in the engine models of the engine modelling module 44. Cost parameters associated with the cost functions described above may be updated in order to effect a change in the priorities of the internal combustion engine controller (i.e. to change an operational mode of the internal combustion engine 1).

As discussed above, the engine modelling module 44 of the performance objective function utilises models of the internal combustion engine to determine engine performance variables. It will be appreciated that there will be some uncertainty associated with the engine performance variables calculated. Over the lifetime of the internal combustion engine, it will be appreciated that, for example, ageing of the internal combustion engine, and/or variations in manufacturing of the internal combustion engine may result in the actual performance of the internal combustion engine differing slightly from the performance modelled by the engine modelling module 44. In particular, age-related uncertainty may be time varying. The parameter updating module 50 is provided to update engine parameters over time to try counteract the effects of time varying uncertainty on the engine modelling module 44.

As discussed above, the performance objective function (engine modelling module 44) utilises sensor data and the plurality of input variables to calculate one or more engine performance variables. Some of these engine performance variables may be related to a physical property of the internal combustion engine which may be observed by a further engine sensor. The parameter updating module 50 is configured to make a model observation of a given engine performance variable and a physical observation of the engine performance variable based on sensor data obtained from the internal combustion engine. By comparing model observation and the physical observation, the parameter updating module 50 is configured to determine an engine parameter to reduce any difference between the model observation and the physical observation. It will be appreciated that the engine models used by the parameter updating module are time invariant. As such, any difference that occurs over time between the model observation of the engine performance variable and the physical observation of the engine performance variable is effectively considered to be due be a change in the operating condition of the internal combustion engine 1.

As shown in FIG. 5, the parameter updating module 50 outputs the engine parameter to the performance objective function of the map updating module 40. The performance objective function utilises the engine parameter to update a corresponding engine performance variable calculated by the engine modelling module 44 in order to reduce uncertainty. The updated engine performance variable is then input to the cost module 46 portion of the performance objective function.

For example, in one embodiment the engine performance variable representing NOx quantity maybe calculated by the engine modelling module 44 based on sensor data. However, there may be some uncertainty associated with this calculated NOx quantity. Uncertainty may arise from manufacturing variation of the internal combustion engine, deterioration of the internal combustion engine and/or environmental uncertainty. For example, the actual NOx quantity produced by a given internal combustion engine may depend on unmeasured disturbances such as engine wear or humidity. To try to counteract such uncertainty, the parameter updating module 50 may update one or more engine parameters to reduce uncertainty in the calculation of engine performance variables.

The parameter updating module 50 may be provided with additional sensor data from an aftertreatment system connected to the internal combustion engine 1 from which an actual NOx quantity may be determined. For example, the parameter updating module may be provided with sensor data from a NOx sensor connected to the aftertreatment system. The parameter updating module 50 may also be provided with the same sensor data as the map updating module 40 and input parameters from which the parameter updating module can calculate a NOx quantity using the same engine models as the engine modelling module 44.

The parameter updating module 50 is configured to determine a NOx correction parameter to reduce any difference between a NOx quantity calculated by the engine modelling module and an actual NOx quantity observed by a sensor connected to the internal combustion engine 1.

Figure 6:
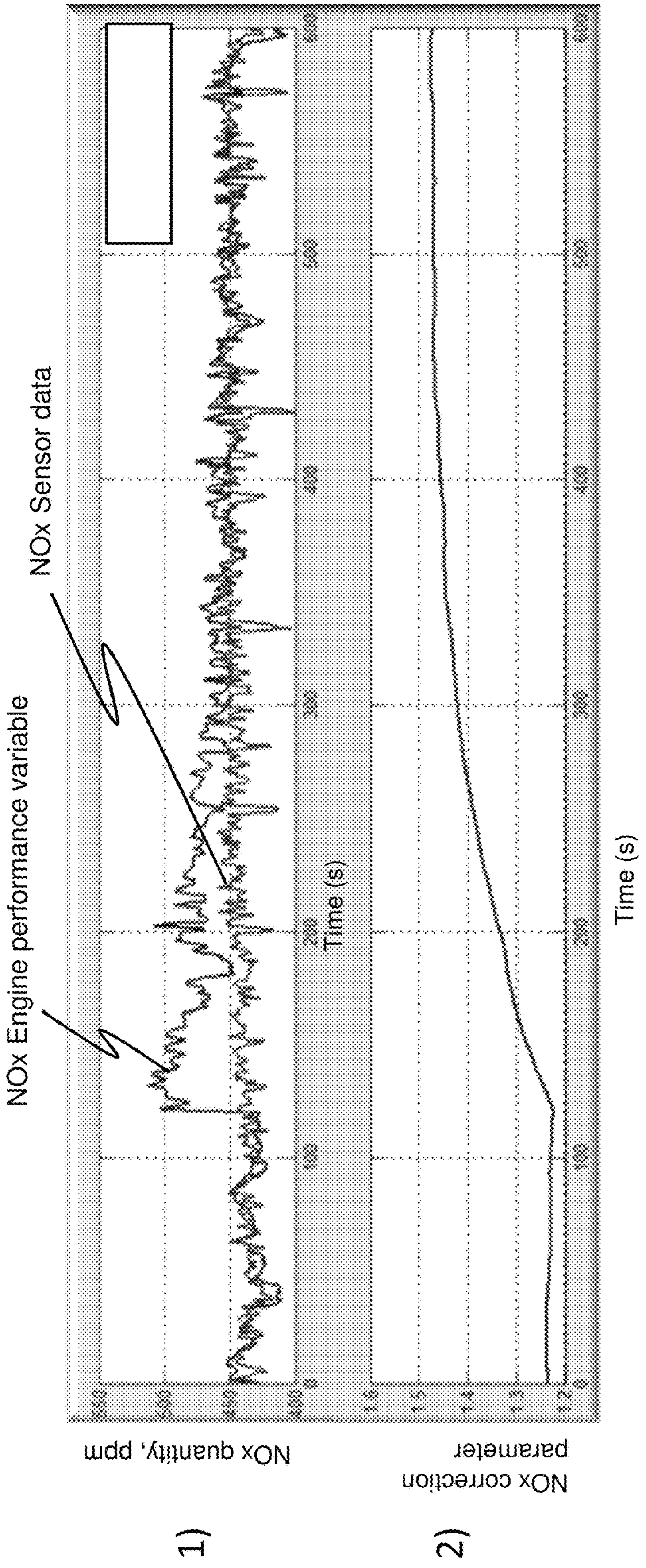
FIG. 6 is a graphical representation of a time varying change in a NOx correction parameter in response to an observed change in the operating condition of the internal combustion engine.

FIG. 6 shows an example of a time varying change in a NOx correction parameter in response to an observed change in the operating condition of the internal combustion engine 1. In the example of FIG. 6, the internal combustion engine 1 is running under steady state conditions under control of an internal combustion engine controller 10 according to this disclosure. At time t=120 s, an artificial mass error in the EGR sensor was introduced. The EGR sensor data is used one of the sensor data inputs used by the engine modelling module 44 to calculate the NOx quantity engine performance variable. As shown in the graph 1) of FIG. 6, the disturbance in the EGR sensor results in a disturbance in the NOx quantity engine performance variable calculated by the engine modelling module 44. FIG. 6 also shows a plot of the NOx quantity measured by a NOx sensor connected to the aftertreatment system over the same time period. As shown in FIG. 6, the actual NOx quantity output by the internal combustion engine is unchanged at time t=120 s.

Graph 2) of FIG. 6 shows a plot of the NOx correction parameter over the corresponding time period of graph 1). Prior to time t=120 s, the internal combustion engine is running in steady state and so the NOx correction parameter is set at about 1.23. Once the disturbance in the EGR sensor is introduced at time t=120 s, the parameter updating module 50 observes a difference between the model observation of the NOx quantity engine performance variable and the physical observation of the NOx quantity by the NOx sensor. The parameter updating module adjusts the NOx correction parameter over time to reduce the difference between the model observation and the physical observation as shown in FIG. 6. Thus, the parameter updating module 50 acts to correct the disturbance introduced at the EGR mass sensor and reduces the difference between the model observation of NOx quantity and the actual NOx quantity detected by the sensor.

It will be appreciated that the example of FIG. 6 in which an artificial disturbance is applied to the EGR sensor is provided to aid understanding of the present disclosure, and that the present disclosure is not to be understood to be limited to only counteracting short term instantaneous disturbances. Further, although in the example of FIG. 6, a disturbance in a sensor is used to demonstrate the effect of the parameter updating module 50, it will be appreciated that the present disclosure is not limited to counteracting sensor errors. For example, the parameter updating module 50 may also be configured to account for input sensitivity to the internal combustion engine which results in a difference between the performance and/or emissions of the internal combustion engine relative to the values calculated by the engine modelling module 44.

As further shown in FIG. 5, the parameter updating module 50 may be update one or more cost parameters associated with one or more cost function of the performance objective function upon determining a change in the operating condition of the internal combustion engine. As discussed above, the cost functions of the performance objective function may include operating target functions, emissions functions, and/or engine constraint functions. Each of these types of cost functions may have one or more cost parameters associated with them. The parameter updating module 50 may update the relative values of these cost parameters in order to adjust the relative significance of each cost function to the overall cost calculated for each candidate group of actuator setpoints. Accordingly, the parameter updating module 50 may effectively provide time-varying adjustments to the strategy of the map updating module 40 when searching for an optimised hypersurface. This in turn allows the internal combustion engine controller 10 to operate in a range of different environments and at different operating points using a reduced number of control maps.

For example, the parameter updating module 50 may utilise data from the aftertreatment system in order to determine that a regeneration of the aftertreatment system is to be performed (e.g. an indication from the aftertreatment system that regeneration is required). Such an indication may be based on a determination that DPF soot load has risen above a threshold value. Accordingly, one or more of the cost parameters may be updated such that the map updating module 40 changes strategy from e.g. a preference for prioritising low fuel consumption to prioritising high exhaust temperature. Thus, the parameter updating module 50 may update some of the cost parameters of the performance objective function in order to effect a regeneration of the aftertreatment system.

For example, an emissions function may be provided to assign a cost to an exhaust minimum temperature engine performance variable including an associated exhaust minimum temperature cost parameter ($T_L$). To regenerate the aftertreatment system (for example to regenerate a Diesel Particulate Filter (DPF)), the parameter updating module 50 may increase the cost parameter $T_L$ from a negligible value (e.g. −273.15° C.) to a higher value (e.g. 400° C.). The internal combustion engine may not be able to reach such an exhaust temperature, but will be encouraged to find a solution that minimises the deviation from this value, thereby increasing exhaust temperature such that the after treatment system may be regenerated. As such, the cost parameter $T_L$ may be used to trigger an aftertreatment thermal management mode in which the exhaust gas temperature output from the internal combustion engine is increased. When aftertreatment thermal management is no longer required (e.g. once the regeneration process is complete), the parameter updating module 50 may adjust the parameter $T_L$ to a negligible value (e.g. −180° C.). As such, when aftertreatment thermal management is not required, the significance of the emissions function for EMT is reduced relative to other cost functions.

In order to determine if the DPF should be regenerated, an engine performance variable representative of DPF soot load may be provided to the parameter updating module 50. Alternatively, DPF soot load may be derived by the parameter updating module 50 from sensor data provided by the internal combustion engine. For example, DPF soot load may be an engine performance variable derived by the internal combustion engine controller from sensor data representative of DPF soot load, for example comparison of expected DPF differential pressure at a given mass flow compared with a measured DPF pressure differential to infer DPF soot load.

In some operating environments, actual DPF soot load may vary, for example due to soot build up on the DPF. The parameter updating module 50 may update the cost parameter $T_L$ in response to determining that DPF soot load has exceeded an upper DPF soot load threshold. As such, a change in the DPF soot load represents a change in the operating condition of the internal combustion engine. Thus, in some embodiments, parameter updating module 50 may determine that when the DPF soot load rises above the upper DPF soot load threshold the DPF should be regenerated. Thus the parameter updating module 50 may update the cost parameter $T_L$ from a negligible value (e.g. −273.15° C.) to a higher value (e.g. 400° C.). Once the DPF is regenerated (i.e. soot is burnt off the DPF to reduce the DPF soot load) the parameter updating module 50 may adjust the parameter $T_L$ to a negligible value (e.g. −180° C.). The DPF may be determined to be regenerated by the parameter updating module 50 based on determining that the DPF soot load has fallen below a lower soot load threshold. Alternatively, or in addition to the lower DPF soot load criteria, the parameter updating module 50 may determine that the DPF is regenerated after a predetermined time period has expired. Depending on the specific requirements of the internal combustion engine and the DPF, the predetermined threshold in other embodiments may be varied. For example, the DPF soot load threshold may be at least: 85%, 90% or 95%.

In other embodiments, the parameter updating module 50 may update the relative values of the weights of the cost functions in order to cause a regeneration of the aftertreatment system. As such, the weight parameters of the cost functions may be updated from a preference for prioritising low fuel consumption to e.g. prioritising high exhaust temperature by altering one or more Weight parameters associated with the cost function(s).

In some embodiments, the parameter updating module 50 may include more than one function for updating a parameter of the performance objective function. For example, in some embodiments, the parameter updating module 50 may include an SCR temperature function for updating the exhaust minimum temperature $T_L$ based on a sensor data representative of a temperature of the SCR catalyst (e.g. SCR inlet temperature). This functionality may be provided as an alternative, or in addition to the parameter updating module 50 determining if the DPF should be thermally managed as described above. The SCR temperature function of the parameter updating module is configured to increase the exhaust minimum temperature cost parameter $T_L$ in response to determining that sensor data representative of SCR catalyst temperature ($T_{SCR}$) is below a threshold SCR lower temperature ($k_{SCR1}$). To increase the SCR catalyst temperature, the parameter updating module 50 may increase the cost parameter $T_L$ from a negligible value (e.g. −273.15° C.) to a higher value (e.g. 400° C.). As such, the SCR temperature function may also update the cost parameter $T_L$ to provide an aftertreatment thermal management mode. The higher value for $T_L$ may be maintained until $T_{SCR}$ exceeds a threshold upper temperature, at which point the $T_L$ may be updated to a negligible value. Effectively, the SCR temperature function may incorporate a form of hysteresis between $k_{SCR1}$ and $k_{SCR2}$ to smooth out the frequency of updates to $T_L$ as a result of the SCR temperature function.

The parameter updating module 50 may store emissions data received from the aftertreatment system relating to emissions of the internal combustion engine. The parameter updating module 50 may utilise the emissions data to monitor the emissions performance of the internal combustion engine. In some embodiments, the parameter updating module 50 may adjust one or more of the emissions functions based on the monitored emissions performance. Thus, the internal combustion engine controller 10 may be configured to control an internal combustion engine 1 in a manner which complies with various emissions regulations. It will be appreciated that emissions regulations may vary depending on the location of operation of the internal combustion engine. Unlike time-invariant control maps, which may be individually calibrated to comply with specific emissions targets in advance, the parameter updating module 50 of the internal combustion engine may be updated to comply with local emissions regulations as appropriate. Thus, the calibration requirements of the internal combustion engine controller 10 may be further reduced.

For example, the parameter updating module 50 may update the cost parameters associated with an emissions function ($Cost_{NOx}$) in response to changes in SCR conversion efficiency. The parameter updating module 50 may update the cost parameter target upper limit $T_U$ in response to changes in SCR conversion efficiency. Accordingly, the parameter updating module 50 may vary the cost parameter $T_U$ to try to counteract variations in SCR efficiency such any variation in tailpipe NOx quantity is reduced or eliminated.

In one embodiment, the parameter updating module 50 may include a target updating function to update the cost parameter $T_U$ which takes into account variations in the SCR conversion efficiency. According to this embodiment the parameter updating module may determine, or be provided with, a desired upper limit $D_U$ for NOX quantity. For example, the parameter updating module may be calibrated with a desired upper limit for NOx quantity depending on the internal combustion engine to be controlled. In the embodiment of FIG. 5 for example, $D_U$ may be 4 g/kWh. The parameter updating module 50 may calculate $T_U$ based on $D_U$ and a scaling factor based on the SCR conversion efficiency ($k_{CE}$):

$$T_U = D_U * k_{CE}$$

The scaling factor $k_{CE}$ may reflect a difference between the expected SCR conversion efficiency (e.g. the expected SCR conversion efficiency assumed by the engine modelling module), and the actual SCR conversion efficiency determined by the parameter updating module 50 in real time. The scaling factor $k_{CE}$ may have an upper limit of 1 corresponding to when the actual SCR conversion efficiency is equal to or greater than the expected SCR conversion efficiency. The scaling factor $k_{CE}$ may have a lower limit of X when the actual SCR conversion efficiency is less than or equal to the SCR conversion efficiency threshold, X may be less than 1 and greater than about 0.4 For example, lower limit X may be 0.4, 0.5, 0.6, or 0.7. Accordingly, in one embodiment, the target updating function may scale the target upper limit for NOx quantity from 4 g/kWh when the SCR catalyst is operating at 95% efficiency to 2 g/kWh when the SCR catalyst is operating at 90% efficiency. The scaling over the range between these values may be linear or any other form of suitable relationship.

In some embodiments, the parameter updating module 50 may adjust one or more of the emissions functions based on the monitored emissions performance by updating a scaling factor used to calculate a cost parameter. For example, the parameter updating module may update the cost parameter $T_U$ by updating the scaling factor $k_{CE}$ based on the monitored emissions performance.

INDUSTRIAL APPLICABILITY

The internal combustion engine controller 10 of this disclosure may be configured to control an internal combustion engine in variety of configurations.

One application may be for controlling the actuator setpoints of an internal combustion engine as illustrated in FIG. 1. The internal combustion engine may be installed on, for example, a vehicle or piece of machinery, or may form part of a generator.

The invention claimed is:

1. An internal combustion engine controller for an internal combustion engine comprising:

- a memory configured to store a plurality of control maps, each control map defining a hypersurface of actuator setpoints for controlling at least one actuator of a plurality of actuators of the internal combustion engine based on a plurality of input variables to the internal combustion engine controller; and
- a processor comprising:
  - a map updating module configured to calculate an optimized hypersurface for a first control map based on a performance objective function of the internal combustion engine, sensor data from the internal combustion engine, and the plurality of input variables, wherein the performance objective function includes parameters; and a parameter updating module configured to update a parameter of the performance objective function upon determining a change in an operating condition of the internal combustion engine;

wherein the parameters comprise one or both of: engine parameters associated with an engine model; and cost parameters associated with a cost function;

wherein the map updating module is configured to update the hypersurface of the control map based on the optimized hypersurface, and are engine setpoint module configured to output a control signal to a first actuator based on a location on the hypersurface of the first control map defined by the plurality of input variables; and wherein the map updating module further comprises:

an optimizer module configured to search for an optimized hypersurface wherein the optimizer module selects a plurality of candidate groups of actuator setpoints to be evaluated by the performance objective function, and the optimizer module is configured to output an optimized hypersurface for the first control map based on the evaluations of the candidate groups or actuator setpoints by the performance objective function.

2. The internal combustion engine controller according to claim 1, wherein the map updating module is configured to calculate an optimized hypersurface within a time period of 1 second.

3. The internal combustion engine controller according to claim 1, wherein the map updating module is configured to calculate an optimized hypersurface for each of the control maps concurrently; and the map updating module is configured to update the hypersurface of each of the control maps based on the respective optimized hypersurfaces.

4. The internal combustion engine controller according to claim 1, wherein the performance objective function comprises:

an engine modelling module configured to calculate a plurality of engine performance variables associated with each candidate group of actuator setpoints of a plurality of candidate groups of actuator setpoints based on the input variables, the sensor data from the internal combustion engine, the engine parameters, and the candidate group of actuator setpoints; and a cost module configured to evaluate the engine performance variables and output a cost associated with each candidate group of actuator setpoints based on the cost parameters.

5. The internal combustion engine controller according to claim 4, wherein the engine parameters comprise time varying engine parameters based on an input from an aftertreatment system connected to the internal combustion engine.

6. The internal combustion engine controller according to claim 4, wherein the cost parameters comprise time varying cost parameters based on an input from an aftertreatment system connected to the internal combustion engine.

7. The internal combustion engine controller according to claim 1, wherein the change in the operating condition of the internal combustion engine is based on an observed difference between the engine model and the internal combustion engine.

8. The internal combustion engine controller according to claim 7, wherein the change in the operating condition is determined based on a change in sensor data output from a sensor of the internal combustion engine relative to an engine performance variable representative of a predicted value of the sensor data; and the parameter updating module is configured to update an engine parameter of the performance objective function to reduce a difference between the sensor data and the engine performance variable representative of the predicted value of the sensor data below a predetermined threshold.

9. The internal combustion engine controller according to claim 1, wherein the parameter updating module is configured to determine the change in the operating condition of the internal combustion engine based on at least one of: the input variables to the internal combustion engine controller, the sensor data from the internal combustion engine, and sensor data from an aftertreatment system of the internal combustion engine.

10. A method of controlling an internal combustion engine comprising:

providing a plurality of control maps, each control map defining a hypersurface of actuator setpoints for controlling an at least one actuator of a plurality of actuators of the internal combustion engine based on a plurality of input variables to an internal combustion engine controller; and calculating an optimized hypersurface for a first control map based on a performance objective function of the internal combustion engine, sensor data from the internal combustion engine, and the plurality of input variables, wherein the performance objective function includes parameters; and updating a parameter of the performance objective function upon determining a change in an operating condition of the internal combustion engine, wherein the parameters comprise one or both of: engine parameters associated with an engine model; and cost parameters associated with a cost function;

wherein the hypersurface of the control map is updated based on the optimized hypersurface, and outputting a control signal to a first actuator based on a location on the hypersurface of the respective control map defined by the plurality of input variables; and wherein calculating an optimized hypersurface comprises:

searching for an optimized hypersurface by selecting a plurality of candidate groups of actuator setpoints to be evaluated by the performance objective function, and outputting an optimized hypersurface for the first control map based on the evaluation of each of the candidate groups of actuator setpoints by the performance objective function.

11. The method according to claim 10, wherein an optimized hypersurface is calculated within a time period of 1 second.

12. The method according to claim 10, wherein an optimized hypersurface for each of the control maps is calculated concurrently; and the hypersurfaces of each of the control maps are updated based on the respective optimized hypersurfaces.

13. The method according to claim 10, wherein the performance objective function comprises:

the engine model configured to calculate a plurality of enaine performance variables associated with each candidate group of actuator setpoints of a plurality of candidate groups of actuator setpoints based on the input variables, the sensor data from the internal combustion engine, the engine parameters, and the candidate group of actuator setpoints; and a cost model configured to evaluate the engine performance variables and output a cost associated with each candidate group of actuator setpoints based on the cost parameters.

14. The method according to claim 13, wherein the engine parameters comprise time varying engine parameters based on an input from an aftertreatment system connected to the internal combustion engine.

15. The method according to claim 13, wherein the cost parameters comprise time varying cost parameters based on an input from an aftertreatment system connected to the internal combustion engine.

16. The method according to claim 10, wherein the change in the operating condition of the internal combustion engine is based on an observed difference between the engine model and the internal combustion engine.

17. The method according to claim 16, wherein the change in the operating condition is determined based on a change in sensor data output from a sensor of the internal combustion engine relative to an engine performance variable representative of a predicted value of the sensor data;

wherein updating an engine parameter reduces a difference between the sensor data and the engine performance variable representative of the predicted value of the sensor data below a predetermined threshold.

18. The method according to claim 10, wherein determining the change in the operating condition of the internal combustion engine is based on at least one of: the input variables to the internal combustion engine controller, the sensor data from the internal combustion engine, and sensor data from an aftertreatment system of the internal combustion engine.

* * * * *